Figure 1:
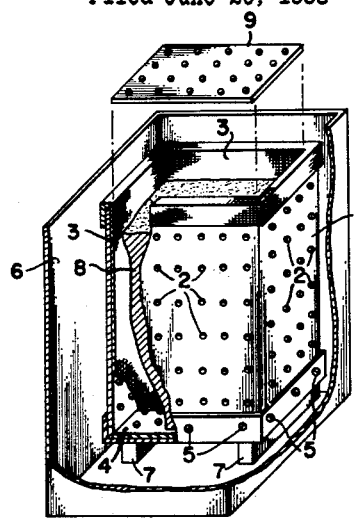

INVENTORS
ARTHUR M. SADLER
CLAIR D. MITCHELL
HOMER E. WALTER

BY *R. Hoffman*
ATTORNEY

United States Patent Office 2,942,983
Patented June 28, 1960

2,942,983
METHOD OF MANUFACTURING CHEESE
Arthur M. Sadler, Laurel, Clair D. Mitchell, Hyattsville, and Homer E. Walter, Silver Spring, Md., assignors to the United States of America as represented by the Secretary of Agriculture Filed June 20, 1958, Ser. No. 743,513
3 Claims. (Cl. 99—116)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to improvements in the method of manufacturing cheese. In particular, this invention relates to a new procedure in the process of manufacturing cheese, such as Cheddar cheese and other cheeses, whereby the cubed curds are collected and matted into a block in an efficient, quality-improving, reproducible manner.

An object of this invention is to approach mechanization of the cheesemaking process. Mechanization reduces the variables encountered from one batch of cheese to another, thereby promoting uniform quality of product. Mechanization also saves labor and reduces manufacturing costs.

Another object of this invention is to help bring about more efficient utilization of existing cheesemaking equipment in the cheese plant. A further objective is to centralize certain cheesemaking operations in the cheese plant.

In a typical process for manufacturing a cheese product, such as Cheddar cheese, milk is pasteurized, cooled to 86 to 90° F., inoculated with strains of lactic-acid-producing bacteria such as *Streptococcus lactis* and *Streptococcus cremoris*, and allowed to ripen to develop the desired acidity. Rennet is added to coagulate the milk, thus forming the curd. A setting temperature of 88° F. is recommended. When the milk has coagulated to produce a curd of the correct firmness it is cut into ¼ or ⅜ inch cubes by means of curd knives. Stirring the cubed curd with an agitator, the temperature of the whey and curd is raised to within the range of 95 to 104° F. When the acidity of the whey reaches a certain level and the curd is properly firm, the whey is drained from the cooked curd. The loose curd is packed about 7 to 8 inches deep in the bottom of the vat where, as more whey drains, the curd settles into a cohesive mat. As soon as the curd has matted sufficiently to be turned without breaking, it is cut into slabs, and the turning and piling procedure begins. The slabs are handled every 15 minutes for two hours to promote drainage of the whey. The drained slabs are then cut into pieces or milled, salted and pressed into forms.

Over the years, especially in the last 10 to 15 years, various steps in the process have been standardized in an attempt to develop a method for consistently producing a Cheddar cheese of uniform quality. Good quality milk is used, the bacterial starters are prepared with strict uniformity, temperature and acidity of the milk at each step are kept within certain limits, and the whole process proceeds on a time schedule, such as that described in U.S. Department of Agriculture Circular No. 880 (May 1951).

Except for the time schedule, the cheddaring or matting step has remained unchanged over the years. The usual schedule for making Cheddar cheese allots 2¼ hours from the time of draining the whey from the curd until the slabs are cut or milled. The raking, cutting and turing operations add up to 10 to 12, maybe more, times that the curd is handled. The handling and the exposure of the curd in the vat during these operations pose the problems of contamination with foreign objects and microorganisms. When the whey is drained during the usual procedure, air replaces most of the whey between individual particles of curd and becomes entrapped in the slabs of curd. Only a part of such entrapped air is removed while the slabs of curd are being turned, piled and milled, resulting in mechanical opening in the cheese. These factors adversely affect the quality of the final product. Moreover, temperature control is a problem. If the curd cools too rapidly, the cheese may have numerous mechanical openings resulting from entrapped air. Maintaining a proper temperature is difficult because vat covers must be removed each time the curd is handled. Regardless of the time schedule, a great deal of subjectivity is introduced into the matting and draining procedure by the very nature of the many operations performed manually.

We have discovered a mechanical procedure for packing, matting and draining excess whey from the curd, which eliminates the problems attendant with the manual procedure just described.

Figure 2:
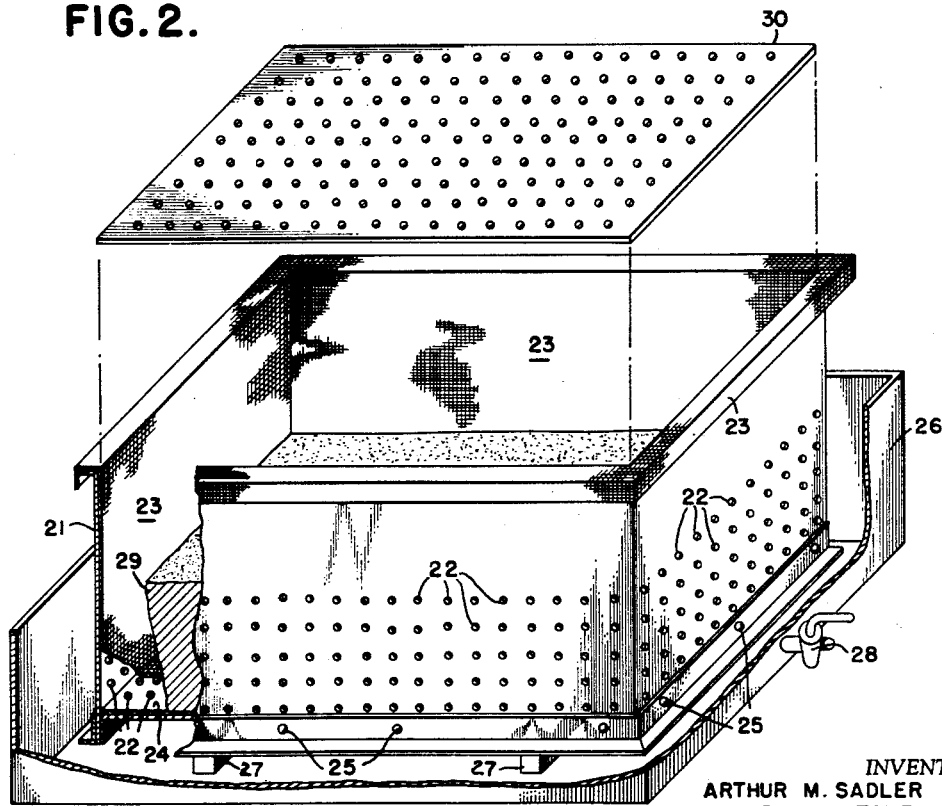

According to the present invention, pasteurized milk is inoculated with a starter culture of lactic acid-producing microorganisms, the milk is coagulated with rennet and subsequently cut into cubes, giving a mixture of curd and whey, which is heated and stirred. The mixture is transferred from the vat into a cloth-lined, perforated "curd retention and matting device," preferably constructed of stainless steel or other inert material, where the curd, submerged in whey, is collected in this container (as shown in Fig. 1 and Fig. 2) until the desired amount, part or all of the curd in the vat, has accumulated in the container, excess whey being withdrawn from the container during this procedure. Pumping is halted, the cloth liner of the "curd retention and matting device" is folded over the curd and whey, a perforated stainless steel follower is introduced into the container and a pressure of about 30 pounds per square foot is applied, usually for a period of two hours. Free whey is allowed to drain during the pressing. After pressing, the mated block of curd is removed from the "curd retention and matting device" and cut into slices and milled in a Cheddar-cheese mill. The milled curd is then salted, hooped and pressed into forms.

Heretofore, the matting or cheddaring procedure has been treated substantially as an art. The appearance and feel of the curd is appraised by the cheesemaker and considered in regard to number of turns of the slabs and as to whether the slabs should be piled. It is considered essential that the slabs have plenty of room to drain properly. Yet the final product is subject to great variations in composition and in quality both from cheese plant to cheese plant and from batch of cheese to batch of cheese in the same plant.

The present invention is a radical departure from the standard procedure, providing many advantages in regard to savings in labor and equipment. For example, the cheese vats are available for reuse as soon as the pumping of curd and whey has been completed. In addition to the technical advantages, the new procedure yields a better, more uniform quality product. As will be demonstrated in the examples below, the product from a process which includes the improvement of this invention is quite uniform in composition and quality regardless of variations in other steps in the process, such as concentration of the starter culture and the temperature of the curd during the cooking step.

In order that the invention may be better understood reference is made to the accompanying drawings in which:

Figure 1 shows a "curd retention and matting device" designed to collect and mat the curd from about 400 pounds of milk, and Figure 2 shows a similar but larger version of the device of Figure 1 capable of holding all of the curd from a small commercial size, 4000-pound cheese vat.

Referring specifically to Figure 1, the numeral 1 represents a rectangular stainless steel form open at top and bottom. The inside dimensions are 11 inches wide x 14 inches long x 24 inches high. All sides of form 1 have holes 2 which are ¼ inch in diameter and located 2½ inches on centers, to facilitate drainage of the whey. The form 1 is lined with cheesecloth 3 in such a manner that there is an overlap of two inches at the top and bottom.

The cheesecloth lined body is inserted into a cheesecloth lined bottom 4 whose inside dimensions are 1 inch depth x 11¼ wide x 14¼ long, and perforated in the same manner as the form 1. The form 1 and bottom 4 are secured together by "through" pins 5. This assembled unit is placed in an open-top tank 6 that is large enough to allow 2 to 3 inches of space around the sides and large enough to allow spacers 7 of 2 to 3 inches to be used between the "cured retention and matting device" and the bottom of this tank. The open-top tank 6 is of such height that it permits complete submersion of curd in the whey and the overflow surplus (whey) is removed. This tank is equipped with a drain valve (not shown) for draining the free whey after transfer and during the subsequent pressing of the curd block 8. The pressing of the curd block 8 is accomplished by placing weights (not shown) on the perforated follower 9.

Figure 2, as previously stated, illustrates a "curd retention and matting device" which can hold all the curd from a small commercial size, 4000-pound cheese vat. As in the case of the smaller device of Figure 1, the rectangular stainless steel form 21 is open at top and bottom. The inside dimensions are 22 inches wide x 45⅞ inches long x 24 inches high. All sides of form 21 have 5 rows of holes, ¼ inch in diameter 22, around the lower half thereof, located 2½ inches on centers, to facilitate drainage of whey. The form 21 is lined with cheesecloth 23 in such a manner that there is an overlap of 2 inches at the top and bottom.

The bottom 24 is of stainless steel whose outside dimensions are 45¾ inches long by 21⅞ inches wide x 1 inch high and has ¼ inch diameter holes located 2½ inches on centers. The inside surface of the bottom 24 is covered with a layer of cheesecloth. The bottom is securely attached to the body with stainless steel pins 25. This assembled unit is placed in an open-top tank 26 that is large enough to allow 2 to 3 inches of space around the sides and also to allow spacers 27 of 2 to 3 inches between the "curd retention and matting device" and the bottom of this tank 26. This open-top tank 26 is of such height that it permits complete submersion of curd in the whey and the overflow surplus (whey) is removed. This tank is equipped with a drain valve 28 for draining the free whey after transfer and during the subsequent pressing of the curd block 29. The pressing is accomplished by placing weights (not shown) on the perforated follower 30 (perforated in same manner as bottom 24).

Although the Figures 1 and 2 have been described in terms of actual measurements, it is obvious that forms of other dimensions can be employed.

Regardless of the dimensions of the form, the diameter and spacing of the perforations should be such that they will permit proper drainage of whey from the curd block, as is obtained with the perforations described in Figs. 1 and 2.

A particular advantage of using a lining, such as cheesecloth, is to facilitate drainage of whey from the curd block and to increase the yield of product by retaining the maximum amount of curd.

Open top tanks 6 and 26 may be of any dimensions and construction that provides the functions intended: to retain sufficient whey so that the curd is collected submerged in whey, thereby preventing entrapment of air in the curd, and, while the curd is being matted, to permit free drainage of the whey.

The metal follower and press weights are applied while the curd is still submerged in whey to facilitate sufficient knitting of the curd to prevent entrance of air between the particles of curd as the whey is drained. The amount of pressure should be enough to promote knitting of the curd but not enough to interfere with proper drainage of whey. With the containers described in Figs. 1 and 2, these conditions were fulfilled with about 30 pounds per square foot, but under other conditions either more or less pressure may be applied.

Our invention will now be described in detail in the following specific examples which illustrate the preferred procedure but do not limit the scope of the invention:

*Example I*

Whole milk containing 3.8 percent butterfat was pasteurized and cooled. Four hundred pounds of this milk was pumped into a regular 1000-pound steam-jacketed cheese vat. The temperature of the milk was adjusted to 88° F. One-half of one percent of S. lactis and one-half of one percent S. durans were added as starters and the milk was allowed to ripen for five minutes. After ripening, 48 cc. of rennet was added. When the milk was properly coagulated, in this case 20 minutes, it was cut in cubes with regular ¼-inch curd knives. The cut curd was agitated slowly to prevent breaking and clumping of the soft particles.

About twenty minutes after cutting, the curd and whey was heated to 102° F. in thirty minutes time. Stirring of the curd and whey was continued for an additional sixty-five minutes. After heating and stirring, the mixture of curd and whey was transferred by pumping into the cheesecloth-lined "curd retention and matting device" (Figure 1). Sufficient whey was first transferred to the "curd retention and matting device" in order that the curd particles in the curd and whey which followed would at all times during pumping be kept completely submerged in whey. After pumping was completed, the cheesecloth was folded over the top of the curd and whey in the "curd retention and matting device." A perforated metal follower and press weights of about thirty pounds per square foot were applied and the free whey was allowed to drain. After about two hours of pressing, the curd block was removed from the "curd retention and matting device," cut into slices suitable for milling (¾-inch thick), and milled with a conventional Cheddar-cheese mill. The milled curd was stirred intermittently for ten minutes and a total of 545 grams of cheese salt was added in three applications. After the salt was adsorbed, which required from about 15 to 20 minutes, the milled and salted curd was hooped in conventional cheese hoops and placed in a horizontal cheese press. After pressing for about thirty minutes the cheese was dressed and further pressed for 16 to 20 hours.

The cheese after pressing may be wrapped, or surface dried for paraffining, and placed at 50° F. for curing. At the time of wrapping this contained 36.90% moisture, 33.00% butterfat and 1.54% salt.

*Example II*

The process of Example I was repeated with the following variations: The starter consisted of two percent of S. lactis and two percent of S. durans, the mixture of curd and whey was heated to 105° F. (same time interval of 30 minutes) and the curd in the "curd retention and matting device" was pressed for only one and one-half hours.

At the time of wrapping this cheese contained 35.91% moisture, 34.00% butterfat and 1.46% salt.

Example III

The process of Example II was followed exactly except for the step of heating the mixture of curd and whey. About twenty minutes after cutting, the curd and whey was heated to 100° F. in thirty minutes time. After stirring the curd and whey for sixty minutes, the temperature was increased to 105° F. in five minutes time and then transferred by pumping into the cheesecloth-lined "curd retention and matting device."

At the time of wrapping this cheese contained 36.23% moisture, 34.00% butterfat and 1.42% salt. The wrapped cheese was placed at 50° F. for curing as in Examples I and II.

Example IV

As in Example III, the process of Example II was followed exactly except for the step of heating the mixture of curd and whey. This time the mixture was stirred for 55 minutes at 100° F., then heated to 110° F. in ten minutes time just prior to collecting the curd and matting it.

At the time of wrapping this cheese contained 35.22% moisture, 34.75% butterfat and 1.40% salt.

Example V

In this example 415 pounds of milk containing 4.0% butterfat was pasteurized, cooled, and pumped into a regular 1000–pound steam-jacketed cheese vat. The temperature of the milk was adjusted to 88° F., the starter of 2% S. lactis and 2% S. durans and the milk ripened, coagulated (49.8 cc. of rennet added) and cut as in Examples II to IV. About 15 minutes after cutting, the curd and whey was heated to 115° F. in 40 minutes time. After stirring for an additional 20 minutes the curd and whey was cooled from 115 to 100° F. in about 15 minutes, then pumped into the "curd retention and matting device." As in previous examples sufficient whey was present in the container to at all times keep the curd completely submerged until the cheesecloth was folded over the curd and the perforated metal follower placed in position. The whey was allowed to drain from the curd while a pressure of about 30 pounds per square foot was applied for about two hours. The curd block was milled, salted and formed into a cheese as described in Example I.

The cheese was wrapped and placed at 50° F. for curing. At the time of wrapping this cheese contained 37.93% moisture, 32.25% butterfat and 1.64% salt.

Example VI

Whole milk containing 3.9 percent butterfat was pasteurized and cooled. This milk was pumped into a regular 4000-pound steam-jacketed cheese vat. In this example 2550 pounds of milk was used. The temperature of the milk was adjusted to 88° F. Seven-sixteenths of one percent of S. lactis was added as a starter and the milk was allowed to ripen for one hour. After ripening, 306 cc. of rennet was added. When the milk was properly coagulated, in this case thirty minutes, it was cut into cubes with regular one-quarter inch curd knives. The cut curd was agitated slowly to prevent breaking and clumping of the soft particles.

About fifteen minutes after cutting, the curd and whey was heated to 100° F. in thirty minutes time. Stirring of the curd and whey continued for an additional sixty minutes. After heating and stirring, the mixture of curd and whey was transferred by pumping into the large-sized cheesecloth-lined "curd retention and matting device" (Figure 2), sufficient whey being first transferred to the "curd retention and matting device" in order that the curd particles in the curd and whey which followed would at all times during pumping be kept completely submerged in whey. After pumping was completed the cheesecloth was folded over the top of the curd and whey in the "curd retention and matting device." A perforated metal follower and press weights of about thirty pounds per square foot were applied and the free whey was allowed to drain.

After about two hours of pressing, the curd block was removed from the "curd retention and matting device," cut into slices suitable for milling (¾ of an inch thick), and milled with a conventional Chedder-cheese mill. The milled curd was stirred intermittently for ten to fifteen minutes, and a total of seven pounds and seven ounces of cheese salt was added in three applications. After the salt was adsorbed, in this case fifteen minutes, the milled salted curd was hooped in conventional cheese hoops and placed in a horizontal cheese press. After pressing for about thirty minutes the cheese was dressed and further pressed for 16 to 20 hours.

The cheese after pressing may be wrapped, or surface-dried for paraffining, and placed at 50° F. for curing. At the time of wrapping the cheese contained:

|  | Moisture, percent | Butterfat, percent | Salt, percent |
|---|---|---|---|
| 20 lb. block | 35.38 | 35.75 | 1.61 |
| 40 lb. block | 35.12 | 36.00 | 1.56 |

Example VII

The process of Example VI was repeated using the same amount of milk, 2550 pounds.

At the time of wrapping the following analyses were obtained:

|  | Moisture, percent | Butterfat, percent | Salt, percent |
|---|---|---|---|
| 20 lb. block | 34.93 | 35.5 | 1.64 |
| 40 lb. block | 35.26 | 36.0 | 1.54 |

Comparison of the analyses of Examples VI and VII shows that the process of this invention results in a product of uniform composition from one batch to another. Comparison of all the examples demonstrates the uniform composition of cheese products of the new process in which variables were percent of starter, temperature to which the curd was heated, and the time of pressing the curd.

The cheese products of the above examples were evaluated for quality after ripening for three months and six months. As the cheese aged the typical Cheddar cheese flavor became intensified and the texture became smooth and waxy. These products were evaluated by experienced cheesemakers and cheese graders who rated them from good to excellent in quality.

A major problem of the cheese industry is the wide variation in quality and lack of uniformity of the products. The process of the present invention will help to provide conditions for consistently producing high quality cheese.

We claim:
1. In a process of manufacturing Cheddar cheese which includes the steps of inoculating pasteurized milk with a culture of lactic acid-producing streptococci, ripening the inoculated milk, adding rennet to coagulate the ripened milk, cutting the coagulated milk, heating the curd and whey to a temperature of about 98 to 115° F., collecting and pressing the curd, milling and salting the pressed curd, hooping and pressing the salted curd, and then ripening the pressed salted curd, the improvement which comprises collecting the curd after the heating step while maintaining the curd completely submerged in whey, wrapping the collected curd in a cloth while so submerged, then draining the free whey, and then pressing the curd while it mats into a solid block of curd.

2. The process of claim 1 in which the lactic-acid-producing streptococci are *Streptococcus lactis* and *Streptococcus durans*.

3. The process of claim 1 in which the lactic-acid-producing streptococci are *Streptococcus lactis* and the temperature of heating the curd and whey is about 98 to 104° F.

References Cited in the file of this patent

UNITED STATES PATENTS

| | | |
|---|---|---|
| 1,578,820 | Gere | Mar. 30, 1926 |
| 2,193,462 | Miollis | Mar. 12, 1940 |
| 2,494,637 | Stine | Jan. 17, 1950 |
| 2,796,351 | Walter et al. | June 18, 1957 |